Feb. 10, 1959  E. P. COCHRAN, JR., ET AL  2,872,805
BEARING TEST APPARATUS
Filed Sept. 20, 1957  4 Sheets-Sheet 1

INVENTORS:
ELVIN P. COCHRAN JR.
GABRIEL A. G. FAZEKAS
BY
Leed Huntzberger
ATTORNEY.

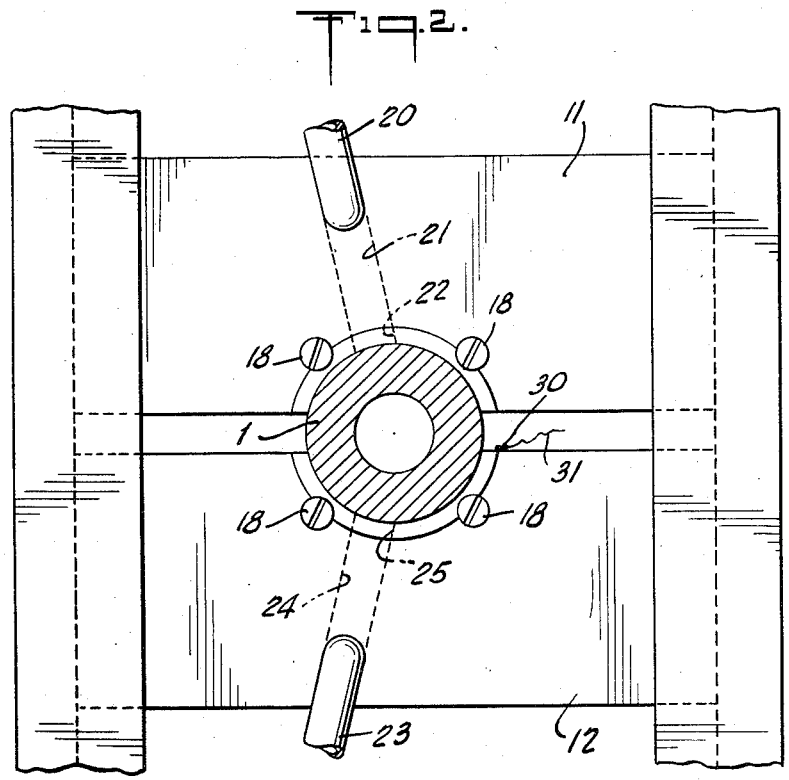
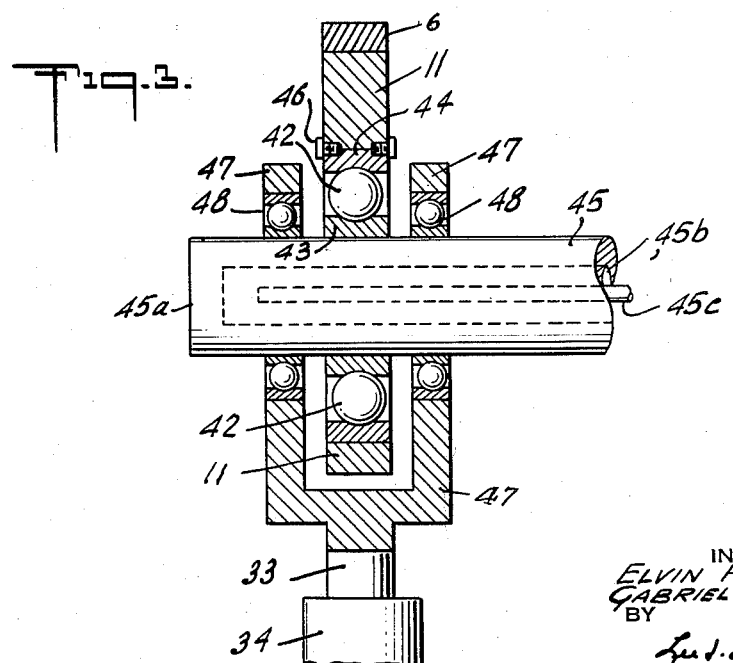

Feb. 10, 1959   E. P. COCHRAN, JR., ET AL   2,872,805
BEARING TEST APPARATUS
Filed Sept. 20, 1957   4 Sheets-Sheet 3
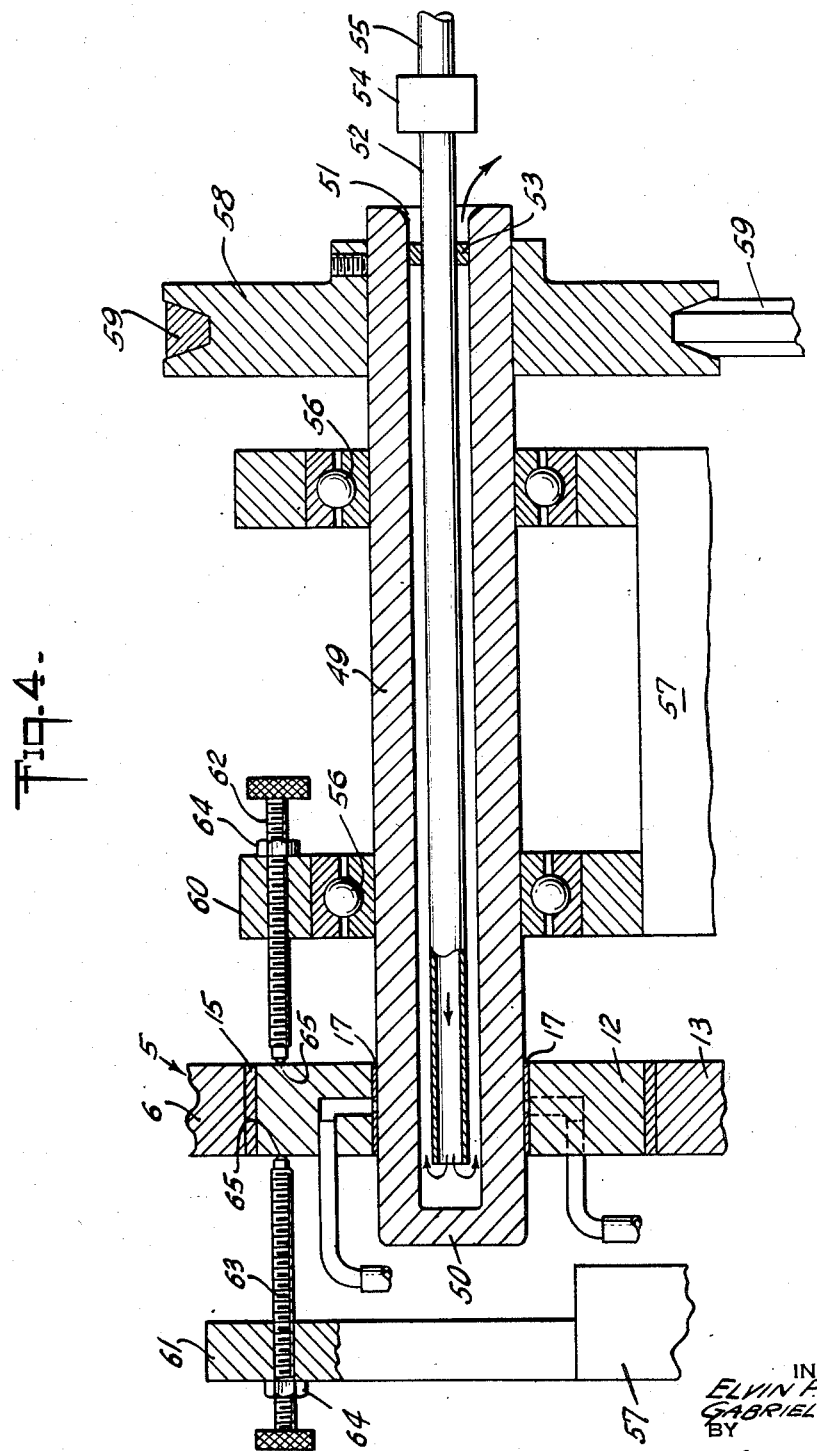
INVENTORS:
ELVIN P. COCHRAN JR.
GABRIEL A. G. FAZEKAS
BY
ATTORNEY.

Feb. 10, 1959 E. P. COCHRAN, JR., ET AL 2,872,805
BEARING TEST APPARATUS
Filed Sept. 20, 1957 4 Sheets-Sheet 4

INVENTORS:
ELVIN P. COCHRAN JR.
GABRIEL A. G. FAZEKAS
BY
ATTORNEY.

United States Patent Office 2,872,805
Patented Feb. 10, 1959

2,872,805

BEARING TEST APPARATUS

Elvin P. Cochran, Jr., Seattle, Wash., and Gabriel A. G. Fazekas, Cos Cob, Conn.

Application September 20, 1957, Serial No. 685,276

24 Claims. (Cl. 73—10)

This invention relates to apparatus for testing and comparing different test bearings and different lubricants to determine their relative effectiveness.

This application is a continuation-in-part of our copending application Serial No. 485,902, filed February 3, 1955, now abandoned. For machinery, such as high speed marine and automotive engines, bearing design centers around the ultimate load carrying capacity, under boundary lubrication, and in such designs a large number of bearing materials must be tested in combination with various oils under both steady and pulsating, unidirectional loads, under conditions that closely resemble those in actual service.

Existing test machines are rather cumbersome and unsatisfactory for such extended tests for three main reasons: (1) all of them apply the load mechanically, resulting in an array of large levers, knife edges and the like, (2) change of bearing specimens or of shaft is a lengthy procedure, not easily performed, and (3) an alternating load is applied only through rotating counterweights, which is a cumbersome procedure.

An object of this invention is to provide an improved, easily handled, light-weight test device for testing and comparing bearings and lubricants, which is particularly useful in exploring the boundary lubrication of heavily loaded marine and automotive bearings or other bearings where the performance of different bearing materials and lubricants under conditions simulating actual use can be obtained.

A further object of the invention is to provide an improved device for testing and comparing the relative values of bearing materials and lubricants, under conditions closely approaching those likely to be encountered in actual use, with which the bearing materials and varying load may be quickly changed, with which the testing may be carried on under controlled temperature conditions, with which the testing may be performed with the bearing under either a steady or pulsating pressure, or under a uniform minimum bearing pressure with pulsations superposed thereon above that minimum according to a predetermined pattern, such as a sine wave cycle, which will enable one to explore the fatigue properties of bearings and bearing materials and which will be relatively simple, compact, practical, convenient, rapid in operation and inexpensive.

Other objects and advantages will be apparent from the following description of several embodiments of the invention, and the novel features will be particularly pointed out hereinafter in connection with the appended claims.

In the accompanying drawing:

Fig. 2 is a face elevation of a portion of the same, with the test shaft in section, such as would be obtained by taking a section through the shaft immediately in front of the frame;

Fig. 3 is a sectional elevation through the testing frame showing the application to the test shaft of means for testing anti-friction, rolling bearings in accordance with this invention;

Figure 1:
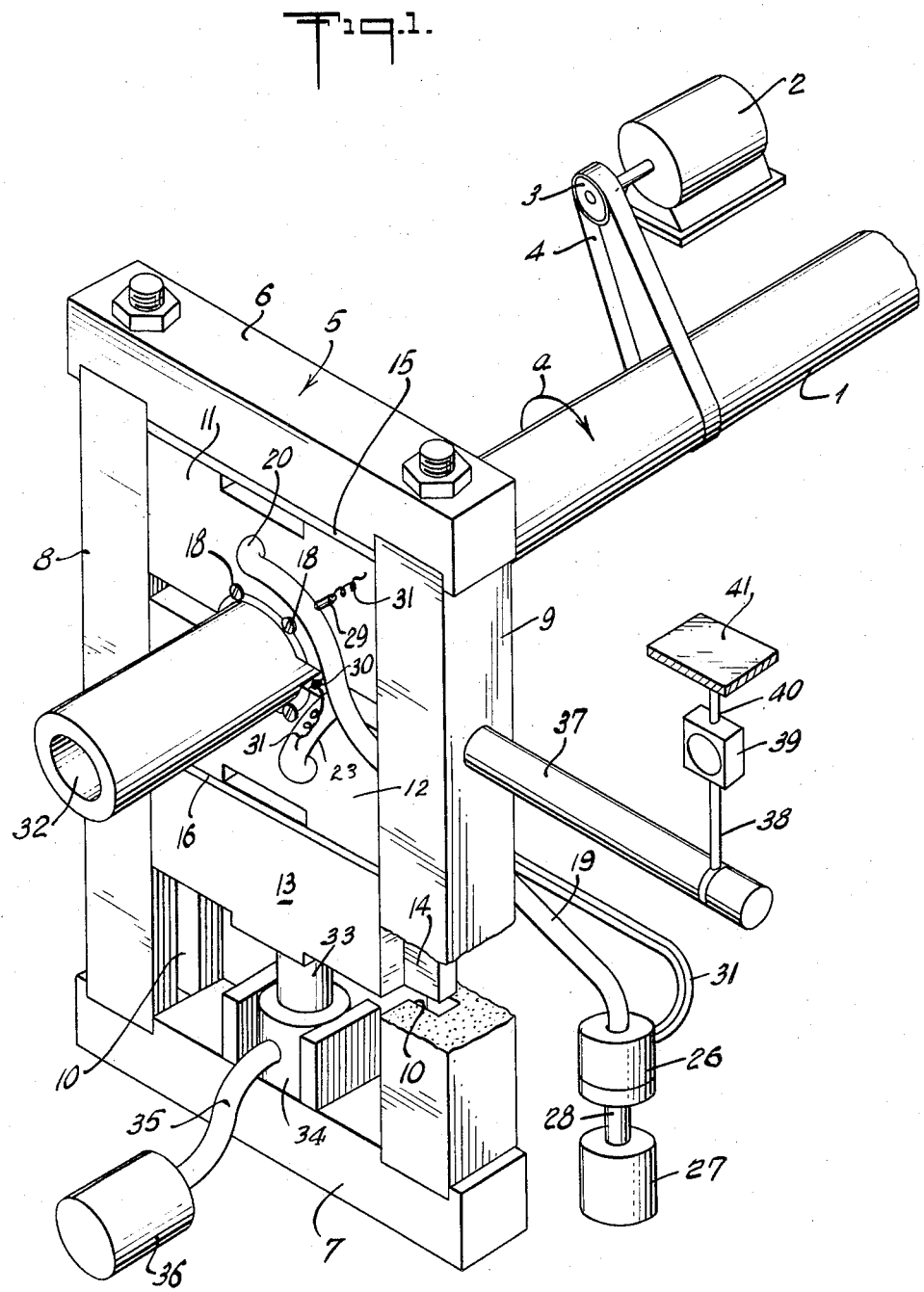
Fig. 1 is a schematic perspective illustrating the principle of one embodiment of the invention.

Fig. 4 is a longitudinal, sectional elevation through a testing device illustrating another embodiment of the invention; and Fig. 5 is a schematic diagram of another embodiment of the invention, illustrating the application of the principle of this invention to the testing of bearing materials under a selected, applied, minimum uniform pressure and also under a pulsating pressure superposed on the uniform minimum pressure.

In the embodiment of the invention illustrated in Figs. 1 and 2, a shaft 1 is mounted for rotation in suitable bearings, not shown, and it may be positively rotated in any suitable manner such as by a motor 2, which operates a drive pulley 3, and the latter through a belt 4 drives the shaft 1. Surrounding a free end of the shaft 1 is a frame 5 having a pair of end bars or members 6 and 7 which are connected by side frame members 8 and 9 so as to form together a rigid frame. The side members 8 and 9 of the frame are provided on their inner faces with grooves 10 which extend from end to end thereof. Disposed between the side members 8 and 9 are two chucks 11 and 12 and a distributing member 13, all of which have a sliding fit between the side members and also have end tongues 14 which fit and slide in the grooves 10 in the side members. The upper chuck 11 abouts against the upper end member 6 of the frame, with preferably a shim or strip 15 of a somewhat deformable material, such as a copper sheet, disposed between the upper face of chuck 11 and the under face of the cross bar 6. Similarly a deformable strip 16, which is similar to the shim or strip 15, is interposed between the adjacent faces of the lower chuck 12 and the distributor 13.

The shaft 1 is received between the chucks 11 and 12, and the faces of the latter that are adjacent the shaft 1 are made circularly concave and concentric with the axis of the shaft. Interposed between these concave faces or surfaces of the chucks and the periphery of the shaft are concave-convex test bearing segments 17 which are to be tested, and these segments have their convex cylindrical surfaces fitting the concave cylindrical surfaces of the chucks in which the segments are disposed. The inner or concave surface of each bearing segment fits the periphery of the shaft 1, as shown clearly in Figs. 1 and 2. The segments are held against displacement lengthwise of the shaft by screws 18 which are threaded jointly into the ends of the bearing segments and the end faces of the chucks 11 and 12. The heads of these screws overlie the ends of the bearing segments 17 so as to prevent endwise movement of the bearing segments along the shaft and the engagement of the sides of the screws in the outer periphery of the bearing segments prevents normal rotation of the bearing segments with the shaft.

The chucks 11 and 12 are spaced apart somewhat as shown when the bearing segments are mounted therein and in engagement with the shaft, so that the chucks may have relative movement toward and from one another to a limited extent at all times. A lubricant, such as a selected lubricating oil, is supplied to the bearing surfaces between the bearing segments and the shaft by a conduit 19 which has a branch 20 leading to the upper chuck 11 and there communicating with a passage 21 (Fig. 2) in the interior of the chuck which opens downwardly into the concave face in which a test bearing segment is received. The test bearing segment also has an aperture 22 (Fig. 2) which is aligned and communicates with the interior passage 21 of the chuck 11, and opens through that face of the segment which bears upon the shaft 1. The lubricant supplied in this manner will pass between the bearing segment and the shaft.

The tube 19 also has a branch 23 which leads to the lower chuck 12 and there communicates with an interior passage 24 in that chuck leading to the interior of the concave cylindrical surface which receives the lower test bearing segment 17. The latter also has an aperture 25 from face to face thereof which is aligned with the discharge end of interior conduit 24 of the chuck 12, so that lubricants supplied through the branch 23 may pass upwardly through the lower bearing segment 17 into contact with the peripheral surface of the shaft, and there be distributed between the bearing surfaces of the lower segment 17 and the shaft. The lubricant or lubricating oil is delivered to the conduit 19 from a thermostatically controlled heater unit and filter 26 (Fig. 1) which not only filters the oil but contains means for heating the oil under thermostatic control. The lubricant or oil is supplied to the unit and filter 26 from a source 27 through pipe 28.

The source 27 is shown conventionally, but it represents the use of a pump and a reservoir to supply the lubricating oil under a continuous pressure. Disposed in the branch 20 of the conduit 19 and near the chuck 11 is a thermocouple 29 which responds to the temperature of the lubricating oil being delivered through the branch 20 to the upper chuck 11. Another thermocouple 30 (Figs. 1 and 2) is secured, such as by cementing, to the upper face of the lower chuck 12 close to the lower test bearing segment 17. These thermocouples are connected by wires 31 to the control unit 26, so that the lubricating oil supplied by the pipe 19 will always be of a uniform temperature and automatically maintained at that temperature.

It is important that the lubricant be applied to the bearing at a selected uniform temperature in order that a proper comparison may be made when the performances of different bearing segments are tested. The shaft 1 is hollow and provided with a passage 32, and swivel connections (not shown) may be made in a well known manner with the ends of the shaft to enable a cooling liquid medium to be circulated through the shaft and maintain it always at a uniform temperature.

The upper chuck 11 abuts against the top of member 6 where the deformable strip 14 is interposed therebetween, and the distributor 13 acting through the deformable strip 16 serves to push the lower chuck 12 upwardly against the shaft, and thus the shaft may be confined between the two bearing segments under a selected pressure provided by the distributor 13. The distributor 13 is urged upwardly by a hydraulic ram piston 33 which engages against the under side of the distributor 13 and reciprocates in a cylinder 34 that is mounted on the lower cross member 7 of the frame. Actuating fluid is supplied to the lower end of the cylinder 34 through a flexible conduit 35 leading to a source 36 of fluid under pressure.

This source may be an injector or other type of pump which will deliver the fluid under pressure to the flexible conduit 35 under any desired pressure, either a steady pressure or one which pulsates unidirectionally in a selected pattern such as in a sine wave cycle. Variable delivery pumps which automatically set themselves to maintain a selected but variable pressure, are well known, and may be employed to provide a pulsating pressure, or a steady pressure at any selected pressure. A suitable cam (not shown) may be employed for shifting the yoke of a variable delivery pump so as to provide the pulsating pressure in accordance with a pattern determined by the contour of the cam.

When fluid under pressure is delivered to the cylinder 34, it forces the piston 33 upwardly and the latter in turn forces the distributor 13 upwardly and causes the lower chuck 12 to approach the upper chuck 11 and provide the desired pressure between the shaft periphery and the bearing segments 17. The deformable strips 15 and 16 accommodate for minor irregularities in the chucks and in the tongue and groove guides between the ends of the chucks and the side members 8 and 9 of the frame. It will be noted that the frame 5, in effect, floats on the end of shaft 1, so that the chucks have relative movement toward and from the shaft. The frame would normally rotate with the shaft due to the friction of the bearing on the shaft if the frame was not otherwise held from rotation. This holding is accomplished by providing a torque arm 37 on one of the side frame members, such as 9, and this arm 37 is connected through a link or a mechanical coupling 38 to a spring scale 39 which is supported by an element 40 from a stationary wall 41.

Assuming that the shaft is rotating clockwise or in the direction of the arrow $a$ (Fig. 1), the frame 5 would tend to rotate clockwise with the shaft and this rotation is restrained by arm 37, the coupling 38 and the scale, and the pull on such coupling is indicated on the spring scale 39, so that the reading on the scale 39 is the measure of the turning torque between the shaft and test bearing and is proportional to the friction between the bearing segments and the shaft under the particular pressure supplied from the source 36 to the ram cylinder 34.

Referring next to Fig. 3, the test bearing there illustrated is of the anti-friction or ball bearing type. In this example, a plurality of spherical balls 42 are confined between an inner raceway 43 and an outer raceway 44. The inner raceway 43 is firmly secured, as by a force fit, to the test shaft 45 which corresponds in function to test shaft 1 in Figs. 1 and 2. The outer raceway 44 is confined to the lower face of the upper chuck 11 by screws 46 which are threaded into the end faces of the upper chuck 11 and also into the margin of the outer raceway 44 at the junction line between the upper chuck and the raceway. The heads of the screws 46 overlie the ends of the outer raceway 44, so as to prevent endwise movement of the raceway 44 in the upper chuck 11, and the engagement of the shanks of the screws 46 in the outer peripherical surface of the outer raceway 45 prevents relative rotation of the raceway 44 about the shaft 45. The usual spacing cage for the balls, not shown, is of course provided in the bearing.

In this example, the lower chuck 12 and the distributer 13 are replaced by the yoke 47 which has tongues on its sides that slide in the grooves 10 of the side frame members 8 and 9. The yoke 47 is forked at its upper end and the arms created by the fork have aligned passages through which the shaft 45 passes, with these arms disposed along opposite faces of the test ball bearing which is confined in the upper chuck 13. It will be noted that in this embodiment, the upper chuck 13 carries the ball bearing to be tested. A standard ball bearing 38 is provided in each arm of the upper end of member 47, between the shaft 45 and the arms of the member 47. The member 47 is forced upwardly by the ram piston 33 which reciprocates in the upper end of a ram cylinder 34 which is supplied with fluid under a steady or pulsating pressure, or both as may be desired, from a suitable source 36.

In this embodiment of the invention, when the ram piston 33 is forced upwardly under fluid pressure, the arms of the member 47 acting through the standard ball bearings 48 will press the bearings 48 against the shaft 45, but since the cylinder 34 of the fluid actuated ram is mounted on the lower cross frame member 7, the fluid pressure exerted by the ram piston 33 will exert a radial pressure on balls 42 and their raceways. In this instance, the fluid actuated means on the frame, by pressing the shaft 45 in a direction which is opposed by the chuck 11, will exert the desired fluid pressure on the test bearing secured in the upper chuck 13, and the friction in the test ball bearing will tend to rotate the frame with the shaft, as explained in connection with Figs. 1 and 2.

The frame, however, is restrained from such rotation by the torque arm 37 as in Figs. 1 and 2, and the amount of this resistance is indicated by the scale 39 as in Figs. 1 and 2. This serves as a basis of comparison of the effectiveness of different ball bearings under test.

The shaft 45, instead of being open from end to end, in this modification is closed at the end 45a and its interior passage 45b is open at the opposite end. A tube 45c extends from the open end of the passage 45b along that passage nearly to the closed end 45a. A cooling medium is supplied under pressure to the pipe 45c and it delivers this cooling fluid to the closed end of the passage 45b, and then this cooling medium passes the length of the shaft to the open end where it is discharged. This provides a simple means of cooling the shaft 45 in any case where it is inconvenient to supply the cooling medium at one end of the shaft and remove it from the other end.

Referring next to Fig. 4, another embodiment of the invention is illustrated in which the shaft 49 is closed at one end at 50, but it is open at the other end at 51. A pipe 52 enters this open end 51 and extends into proximity to the closed end 50 where it discharges. This pipe 52 is spaced in the shaft 49 by one or more apertured collars 53. The pipe 52 is connected by a swivel connection 54 to a stationary pipe 55 that supplies a cooling medium such as cold water to the pipe 52 during rotation of the shaft 49. This cooling medium passes to the closed end of the shaft and then returns through the space exteriorly of pipe 52 to the open end where it is discharged. The shaft 49 is rotatably mounted in suitable bearings 56 provided on a frame 57. The shaft carries a pulley 58 with a V groove in its periphery, and a V belt 59 driven by a suitable motor, not shown, passes around the periphery of the pulley 58 and rotates it and the shaft at suitable speed.

Mounted on the shaft 49 adjacent to its closed end, is a frame 5 similar to the frame 5 of Figs. 1 and 2, and this frame has the upper and lower chucks 11 and 12 and a distributor 13 which is fluid actuated in the same manner as explained in Figs. 1 and 2. The chucks 11 and 12 carry the bearing segments 17 to be tested, and the frame testing means may be identical with that described in Figs. 1 and 2, and similar parts have similar references. The frame 57 has bosses 60 and 61 at opposite faces of the frame, and a screw 62 is threaded through the boss 60 so as to present one end in close proximity to the chuck 11. A screw 63 threaded through the boss 61 presents an end in proximity to the opposite face of chuck 11. Each of these screws 62 and 63 has a lock nut 64 thereon so that the screws 62 and 63 may be locked in adjusted positions. The ends of these screws which approximately abut the opposite faces of the upper chuck 11 preferably have rolling balls 65 that provide anti-friction contact with the faces of the chuck 11 sufficiently to restrain any substantial end-wise movement of the upper chuck 11 and through it of the test frame 5 in a direction along the shaft 49. The bearing segments 17 are lubricated and tested in the same manner as explained for Figs. 1 and 2.

Referring next to the embodiment of the invention illustrated schematically in Fig. 5, the test shaft 65, which corresponds to the shafts 1, 45 and 49 of Figs. 1 to 4, is rotatably mounted in any suitable manner such as described in connection with Fig. 4, and may be hollow and cooled in the manner shown in Fig. 4, the cooling medium being delivered toward the closed end of the shaft by a pipe (not shown) corresponding to the pipe 52 of Fig. 4. A frame 66, similar to the frame 5 of Figs. 1 and 2, has an upper end member 67 and a lower end member 68, and these end members are connected by side frame members 69 and 70. Upper and lower chuck members 71 and 72 are suitable guided in the frame side members 69 and 70 by having tongues on the ends of the chucks 71 and 72 sliding in grooves in the side arms 69 and 70, as illustrated and described in connection with Figs. 1 and 2. The chucks 71 and 72 mount bearing segments 17 to be tested, as explained in connection with Figs. 1 and 2, these bearing segments being held therein in the same manner, by screws 73 corresponding to the screws 18 of Figs. 1 and 2. The bearing segments are supplied with a lubricant through the upper and lower chucks 71 and 72 in the same manner as explained in connection with Figs. 1 and 2, through a main conduit 74, having branches 75 and 76. Thermocouples 77 and 78 are secured one in the branch 76 and the other on the chuck 72 as explained in connection with Figs. 1 and 2, and control the temperature of the lubricant supplied by unit 26, as in Figs. 1 and 2.

Copper shims or sheets 79 are disposed between the cross frame end 68 and the adjacent edge of the chuck 72 and also between the upper face of the chuck 71 and the lower face of a platen 80. The platen carries a piston 81 that reciprocates snugly in a cylinder chamber 82 provided in ram casing 83 which is mounted on the upper cross member 67 of the frame. The piston 81 has a reduced end 84 which reciprocates snugly in a reduced diameter cylinder chamber 85 in the casing 83, so that there are in effect two independently operating rams acting on platen 80, one provided by the piston 81 and its cylinder chamber 82, and the other provided by the smaller piston 84 and the smaller piston chamber 85. A pipe 86 leads from the chamber 82 to the side frame 70. From there it is connected by flexible pipe 87 to a pipe 88 at the delivery end of a pump 89. The pump 89 is shown conventionally or schematically merely as having a piston 90 reciprocating in a casing 91, towards and from an outlet port 92 to which the pipe 88 is connected.

The piston 90 is reciprocated by a crank device 93 which is driven through a coupling 94 by a motor 95, with a variable speed drive 96 interposed between the motor 95 and the drive coupling 94. The variable drive may be operated to vary the speed of coupling 94 by operation of a control handle 97. The cylinder of the pump 91 is provided with a port opening 98 in a side wall thereof, which is uncovered and passed each time the piston 90 is retracted. This port 98 is connected by a pipe 99 to a reservoir 100 which supplies operating liquid to the pump 91. The pipe 88 is connected through a check valve 101 to a port 102 in a pressure relief valve 103, having a valve element 104 which is held seated by a spring 105 against the pressure of liquid delivered by the pipe 88. The tension of the spring 105 and hence the pressure at which the valve opens, may be varied by turning a head 106 that is threaded into the chamber 107 of valve 103. The valve chamber 107 is connected by a port 108 and a pipe 109 to the reservoir. A pressure gauge 110 is connected by pipe 111 to the pipe 88 between the check valve 101 and the pressure relief valve 103.

The upper end of the smaller piston chamber 85 is provided with a port 112 which communicates with a passage 113 extending through the upper cross member 67 of the frame, and which is connected by a flexible pipe 114 to supply conduit 115. A pressure gauge 116 is connected to conduit 115 to indicate the fluid pressure on piston 84. An accumulator 117 is also connected by pipe 118 to the supply conduit 115. A check valve 119 is provided in the pipe 115 between a pump cylinder 120 and the pipe 118 that leads to the accumulator and passes fluid solely to the cylinder 85. The cylinder 120 has a piston 121 reciprocating therein and which is articulately connected by a link 122 to an arm 123 that is pivoted at 124. The other end of the lever 123 may be used as a handle to reciprocate the piston 121 in the cylinder 120. A check valve 125 is provided in the suction pipe 126 leading from the reservoir 100, so that when the piston 121 is reciprocated it will draw liquid from the reservoir 100 through the check valve 125, and then deliver it under pressure to the pipe 115. A weight 127 may be provided on the free end of the lever 123 if desired. A bleed valve B may be provided in pipe 115 between the check valve 119 and the cylinder 85, to permit escape of air in starting and to relieve pressure on ram 84 when test bearings are being changed.

In this embodiment of the invention, the bearing segments 17 to be tested are first mounted on the shaft between the chucks 71 and 72 and then the handle 123 is operated to draw liquid from the reservoir 100 and force it through the pipe 115 and check valve 119 into the smaller piston cylinder 85, where the liquid so introduced acts on the smaller piston 84 and advances it to apply pressure between the bearing segments 17 and the shaft, since the frame is floating on the shaft 65. This applies an equal pressure between both bearing segments 17 and the shaft. The gauge 116 indicates the amount of this impressed fundamental minimum pressure, and the accumulator 117 acts as a balance to accommodate minor displacements of liquid in the smaller chamber 85 while maintaining the fundamental pressure on piston 84 as will be explained later herein.

After a selected minimum pressure has been applied by piston 84 between the bearing segments and the shaft to be tested in this manner, the motor 95 is operated to drive the pump 91 and deliver an actuating fluid, withdrawn from the reservoir 100, through the pipes 88, 87 and the pipe or conduit 86 to the large ram cylinder 82. This supplies a still higher fluid pressure on the larger ram piston 81, which pressure is communicated to the test bearing segment 17 in the same manner as the pressure which is delivered to the bearing segments by the smaller ram 84. The pump 91 is operated continuously at a selected but variable rate, and it also delivers fluid through the check valve 101 to the pressure relief valve 103, after some pressure has been built up in the larger cylinder 82. The continued operation of the pump 91 will build up the pressure in pipes 87, 88 and ram chamber 82 until liquid is forced through the pressure relief valve 103 which opens at the pressure at which it is set. The pressure at which valve 103 opens depends upon the pressure applied to its spring 105, and this determines the maximum unidirectional pressure in the liquid that is supplied to the larger ram cylinder 82. The pressure gauge 101 indicates at all times what this maximum pressure is, and one will know the pressure at which the pressure relief valve 103 is set for.

With such an arrangement, when the piston 90 of the pump 91 is on a pressure stroke, it will raise the pressure in the large ram chamber 82 only up to the maximum pressure for which the pressure relief valve 103 is set, and excess flow of liquid passing through valve 103 will return to the reservoir 100. When the piston 90 of the pump 91 is retracted to uncover the port 98, the pressure in the piston chamber 82 is reduced and falls. Since liquid is substantially incompressible, the retraction of piston 90 in its pump housing or cylinder will create a suction in that cylinder so that when the piston uncovers port 98, liquid from the reservoir 100 will be forced, by atmospheric pressure in the reservoir, to enter the pump chamber in advance of the piston 90. When the piston 90 next again advances and passes the port 98 it will force the liquid received from the reservoir into pipe 88 thus increasing the pressure in ram cylinder 82 until the pressure relief valve 103 opens. The result is that in addition to the continuous uniform pressure on the test bearing segments on the shaft, which is supplied by the small ram 84, a pulsating higher pressure which, in this example, corresponds to a sine wave of pressures, has been superposed on that minimum uniform pressure. Thus the test bearing can be subjected to a continuing minimum, uniform pressure and also a pulsating superposed pressure according to a selected pattern, such as a sine wave, throughout the test. This simulates practical conditions to which the bearing may be expected to be subjected in practical use.

When the pressure in the larger chamber 82 is lessened due to the suction stroke of the piston 90 of the pump 91, there would be a very slight retraction of the larger piston 81, and this would cause a slight retraction of the smaller piston 84 which is integral with the piston 81, and the accumulator 117 permits a slight displacement of liquid from the smaller chamber 85 while maintaining substantially the same pressure in cylinder 85, and then as soon as the piston 81 advances again, the accumulator supplies the necessary liquid to the chamber 85 to maintain it under the same uniform basic pressure. Accumulators of this type are well known in the hydraulic art.

The frame 66 floats on the shaft, and it also has a torque arm 128 which is connected by a coupling 129 to a scale 130 carried by a suitable basic frame 131. Rotation of the frame 66 and the test bearing with the shaft is prevented by this torque arm 128, coupling 129 and scale 130, and the resistance required to prevent such rotation is indicated on the scale 130.

It will be observed that all the various embodiments of the invention provide a very simple and practical device for testing and comparing bearings and bearing materials and determining their fatigue properties, also for comparing the lubricating effects of different lubricants under the same and different bearing conditions, and enabling the bearings and bearing materials to be easily changed. The device is compact, relatively simple and inexpensive yet simulates the pressure conditions to which a test bearing may be subjected in use. The temperatures of the shaft and lubricant may also be controlled so that there would be a uniform basis for comparison of the relative values of different bearings and lubricants. It would generally be unsatisfactory to cool the shaft without controlling the temperature of the lubricant, and vice-versa. The bearing load is measured by reading the hydraulic pressure from the gauge, with corrections from a calibration chart, if desired.

It will be understood that various changes in the details, materials and arrangements of parts, which have been herein described and illustrated in the different embodiments, in order to explain the nature of the invention, may be made by those skilled in the art within the principle and scope of the invention, as expressed in the appended claims.

We claim:

1. Test apparatus comprising a motor fixedly mounted relative to the earth and a shaft connected thereto and oriented horizontally, means for supplying a lubricant to the bearing space of said shaft, a substantially rigid frame having guiding slideways, opposed members between which said shaft extends, formed to receive between them and hold a test journal bearing, and mounted in said slideways of said frame for relative movement toward and from each other to apply a variable bearing pressure between the shaft and test journal bearing, said frame and opposed members being supported solely by said shaft through said test journal bearing and free to rotate about said shaft, fluid actuated means on said frame and operable between said frame and one of said members to cause relative approach of said members and an increase of bearing pressure between the test journal bearing and said shaft, a torque arm secured to said frame, a force measuring means fixedly mounted relative to the earth and positioned for operation by the free end of said torque arm, and operable to restrain rotation of said frame, members and test journal with said shaft.

2. Test apparatus comprising a motor fixedly mounted relative to the earth and a hollow shaft connected thereto and oriented horizontally, a substantially rigid rectangular frame, a pair of opposite sides of said frame being formed with facing guideway grooves along the lengths thereof; a first means and a second means slidably mounted in the guideway grooves of said frame and each being formed with a seat for slightly less than one-half of a journal bearing, the seats in said first and second means being in complementary relationship, said first and second means each being further formed with a conduit for permitting fluid communication between a side thereof and the seat threin, a source of lubricating oil including an oil filter and oil heating means connected to the conduits in said first and second means, temperature measuring means on said first and second means coupled to said oil heating means for keeping the temperature of the lubricating oil at a test bearing substantially constant, hydraulic means, at least a portion of said hydraulic means being secured to said frame and having a force transmitting member, third means slidably mounted in the guideway grooves of said frame for engagement with said force transmitting member and said second means for evenly distributing force applied by said hydraulic means to said second means, a layer of force distributing material between said first means and said frame, a layer of force distributing material between said second means and said third means, said layers of force distributing material being softer than said frame and said first, second, and third means, a torque arm secured to said frame and extending laterally therefrom, a force measuring means fixedly mounted relative to the earth and adapted for connection to the free end of said torque arm; whereby two substantially half sections of a journal bearing having lubrication openings are adapted to be seated and secured in said first and second means with the lubrication openings in registration with the respective conduits, for engaging said shaft to floatingly support said frame and elements mounted thereon on a film of lubricating oil on said shaft.

3. Test apparatus comprising a motor fixedly mounted relative to the earth and a shaft connected thereto and oriented horizontally, a substantially rigid frame having guiding slideways; a first means and a second means slidably engaging the guiding slideways of said frame and each being formed with a seat for slightly less than one-half of a journal bearing, the seats in said first and second means being in complementary relationship, said first and second means each being further forced with a conduit for permitting fluid communication between a side thereof and the seat therein, a source of lubricating oil including an oil filter and oil heating means connected to the conduits in said first and second means, temperature measuring means on said first and second means coupled to said oil heating means for keeping the temperature of the lubricating oil at a test bearing substantially constant, hydraulic means, at least a portion of said hydraulic means being secured to said frame and having a force transmitting member, third means slidably engaging the guiding slideways of said frame for engagement with said force transmitting member and said second means for evenly distributing force applied by said hydraulic means to said second means, a torque arm secured to said frame and extending laterally therefrom, a force measuring means fixed to the earth and adapted for connection to the free end of said torque arm; whereby two substantially half sections of a journal bearing having lubrication openings are adapted to be seated and secured in said first and second means with the lubrication openings in registration with the respective conduits for engaging said shaft to floatingly support said frame and elements mounted thereon on a film of lubricating oil on said shaft.

4. Test apparatus comprising a substantially rigid rectangular frame, a pair of opposite sides of said frame being formed with facing guideway grooves along the lengths thereof; a first means and a second means slidably mounted in the guideway grooves of said frame and each being formed with a seat for slightly less than one-half of a journal bearing, the seats in said first and second means being in complementary relationship, said first and second means each being further formed with a conduit for permitting fluid communication between a side thereof and the seat therein adapted for connection to a source of lubricating oil, hydraulic means, at least a portion of said hydraulic means being secured to said frame and having a force transmitting member, third means slidably mounted in the guideway grooves of said frame for engagement with said force transmitting member and said second means for evenly distributing force applied by said hydraulic means to said second means, a torque arm secured to said frame and extending laterally therefrom, and means operated by the torque arm for indicating the force tending to move the torque arm.

5. Test apparatus comprising a substantially rigid frame having guiding slideways, a first means and a second means slidably engaging the guiding slideways of said frame and each being formed with a seat for slightly less than one-half of a journal bearing, the seats in said first and second means being in complementary relationship, said first and second means each being further formed with a conduit for permitting fluid communication between a side thereof and the seat therein and adapted for connection to a source of lubricating oil, force applying means secured to said frame and adapted for applying force to said first and second means, a torque arm secured to said frame and extending laterally therefrom, and force measuring means mounted independently of the frame and operable by the torque arm to indicate the amount of the force tending to move the torque arm.

6. Bearing testing apparatus comprising a test shaft, means for rotating said shaft, a frame independent of said shaft and having a pressure head, a stressing head mounted in said frame for sliding movement toward and from said pressure head, said shaft extending between said heads and said heads being formed to receive between them and hold against rotation a test bearing that engages said shaft, said frame and heads being rotatable about said shaft and supported solely thereby through the test bearing, fluid actuated means on said frame and selectively operable on said stressing head to force it toward said pressure head and impose a selected bearing pressure between said test bearing and said shaft, means for supplying lubricant under pressure to the interior areas of the bearing surfaces between said shaft and test bearing and means positioned for operation by the frame and resisting rotation of said frame for indicating the rotary torque exerted on said frame by the pressure between said bearing and said shaft.

7. The apparatus as set forth in claim 6 and means for varying the pressure exerted on said stressing head in sine wave cycles.

8. The apparatus as set forth in claim 6 wherein said shaft is hollow for circulation therethrough of a temperature controlling fluid.

9. An apparatus for testing and comparing different bearing materials separately and with various lubricants under both steady and varying load, which comprises a test shaft, means for rotating said shaft, a frame disposed crosswise of and floating on said shaft and having separate chucks on opposed sides of said shaft by which the frame is supported on said shaft, said chucks being formed on their adjacent faces to receive and hold a test bearing in contact with said shaft but against rotation with the shaft, said chucks and frame having tongue and groove sliding connections along opposite sides of said frame for mounting said chucks for movement in a direction crosswise of the shaft axis of rotation toward said shaft, means on said frame for causing such relative sliding movement of said chucks to grip said shaft between said bearing segments with a selected and variable pressure, said frame with its chucks being free to rotate about said shaft axis, means for supplying lubricating oil between the bearing and shaft through the interiors of said chucks and indicating means opposing such rotation of said frame about the shaft, and indicating the amount of the torque on said frame created by said bearings and their tending to rotate said frame with said shaft.

10. The apparatus as set forth in claim 9 wherein said means for causing relative movements of said chucks creates pressures between the bearing and shafts in amounts varying in accordance with a selected periodic cycle of pressures.

11. The apparatus as set forth in claim 9 wherein said shaft is hollow at, and adjacent, said frame and chucks through which a temperature regulating fluid may be passed, and thermocouple means disposed to respond to the temperature of the lubricant adjacent said bearing and automatically controlling the temperature of the lubricating oil delivered to the bearings, whereby bearing materials may be compared under similar and variable loads and temperatures, and with similar and different lubricants.

12. An apparatus for testing and comparing different bearing materials and lubricants, which comprises a test shaft, means for rotating said shaft, a pair of chucks on opposite sides of said shaft, a frame mounting said chucks for relative movement toward and from each other and toward said shaft, said chucks being formed on their adjacent faces, to receive between such faces and hold test bearing means against rotation with said shaft, means for causing relative approach of said chucks and application of a selected pressure between said bearing means and said shaft during rotation of said shaft, and operable to apply a pulsating pressure between the bearing means and shaft automatically according to a selected periodic pattern, and means positioned for operation by said frame for holding the frame, chucks and the bearing means from rotation with the shaft and indicating the amount of the torque tending to rotate said frame and bearing means with said shaft.

13. An apparatus for testing and comparing different bearing materials and lubricants, which comprises a test shaft, means for rotating said shaft, a pair of chucks on opposite sides of said shaft, a frame mounting said chucks for relative movement toward and from each other and toward said shaft, said chucks being formed on their adjacent faces, to receive between such faces and hold test bearing means against rotation with said shaft, means for causing relative approach of said chucks and application of a selected pressure between said bearing means and said shaft during rotation of said shaft, and operable to apply a pulsating pressure between the bearing means and shaft automatically according to a selected periodic pattern, means for supplying a fluid lubricant through said chucks to said bearing means, means responsive to the temperature of said lubricant at the bearing means for controlling the temperature of the lubricant supplied to the bearing means, and means positioned for operation by said frame for holding the frame, chucks and the bearing means from rotation with the shaft and indicating the amount of the torque tending to rotate said frame and bearing means with said shaft.

14. An apparatus for testing and comparing different bearing materials and lubricants, which comprises a test shaft, a frame through which said shaft extends and on which said frame floats, a pair of pressure heads both slidable on said frame and disposed on opposite sides of said shaft, with one head abutting one part of said frame and limited thereby in its sliding movement thereon, fluid actuated means on said frame for moving the other head toward the said one head to grip the test shaft between them, said heads being formed to receive between them and hold against rotation with the shaft the bearing means to be tested, means for introducing a lubricant to the bearing surfaces between said shaft and bearing means, means for applying a pulsating fluid pressure to said fluid actuated means according to a selected pattern, and means for opposing rotation of said frame and bearing means and indicating the torque required to restrain the frame from its rotation with said shaft.

15. The apparatus as set forth in claim 14, and members of deformable material interposed between said one head and frame part and between said other head and said fluid actuated means, to enable limited adjustment accommodation of said heads and bearing means carried thereby to small misalignments in said heads and insure equal loading of the test bearing means by said heads.

16. The apparatus for testing and comparing bearing materials and lubricants as set forth in claim 14, and means responsive to the temperature of the bearing means for controlling the temperature of the lubricant supplied to said bearing means.

17. The apparatus as set forth in claim 14, wherein said fluid actuated means includes means for applying a uniform fluid pressure on the bearing, and also means for repetitively superposing on that uniform pressure, an additional pulsating pressure varying according to a selected pattern of pulsations; whereby the bearing will always have a minimum uniform pressure and also a superposed additional pressure that varies in a periodic manner.

18. The apparatus as set forth in claim 17, and means for controlling the temperature of said lubricant supplied to said bearing automatically according to the temperature of the bearing.

19. An apparatus for testing and comparing different bearings which comprises a test shaft, a frame, relatively movable members carried by said frame, and between which said shaft extends, said members being formed on their adjacent faces to receive and hold the bearing to be tested in engagement with said shaft means on said frame including a fluid actuated member for causing relative movement of said members to apply pressure between said shaft and said bearing, means for applying a pulsating fluid pressure repetitively to said fluid actuated member and through it applying a similar pulsating pressure between said bearing and said shaft, and means positioned to resist rotation of said frame on said shaft and indicate by the degree of resistance to rotation of said frame with the shaft the friction between the bearing and shaft.

20. An apparatus for testing and comparing the relative effectiveness of different bearings, which comprises a rotatable test shaft, means formed to receive and hold a test bearing in bearing contact with said shaft, supported solely on and rotatable with said shaft, and operable to vary the pressure of said bearing against said shaft, means connected to said bearing holding means for applying a selected pulsating pressure to the bearing on said shaft repetitively and automatically according to a selected pattern during rotation of said shaft, and means positioned to resist rotation with said shaft of said bearing receiving and holding means and indicate the force required to resist such rotation of the bearing holding means with the shaft.

21. An apparatus for testing and comparing the relative effectiveness of different test bearings, which comprises a rotatable test shaft, means formed to receive and hold a test bearing in bearing contact with said shaft, means for applying a selected minimum uniform, substantial pressure to the bearing on said shaft in addition to any normal pressure of the bearing on the shaft, means for also applying an increased pressure to said bearing on said shaft by periodic superposed pressure pulsations according to a selected pattern, to provide a composite pressure between the bearing and shaft which periodically pulsates above said substantial minimum pressure, and means for indicating the resistance to rotation of the bearing with the shaft.

22. The apparatus as set forth in claim 21, wherein said means for applying the minimum uniform pressure and the means for increasing the pressure are both fluid actuated and operable separately of one another.

23. The apparatus as set forth in claim 22, wherein the test bearing and both pressure applying means are carried by a frame that floats on said test shaft through said test bearing, and are rotatable together about the shaft, and the means for resisting rotation of the bearing with the shaft, includes resistance to rotation about said shaft of the frame and pressure applying means.

24. An apparatus for testing and comparing different bearings which comprises a test shaft, a frame, relatively movable members carried by said frame, and between which said shaft extends, said members being formed on their adjacent faces to receive and hold the bearing to be tested in engagement with said shaft, means on said frame including a fluid actuated member for causing relative movement of said members to apply pressure between said shaft and said bearing, additional fluid actuated means for applying repetitively additional, increased pulsating pressure between said shaft and bearing above that supplied by said fluid actuated member, with the pulsations having a selected pattern, whereby said bearing will have a minimum continued pressure on said shaft and a pulsating additional pressure superposed thereon according to a selected pattern, and means for holding the bearing and members against rotation with the shaft and indicating the resistance to rotation of the bearing with the shaft.

References Cited in the file of this patent

UNITED STATES PATENTS

| | | |
|---|---|---|
| 1,672,808 | Hansel | June 5, 1928 |
| 2,033,588 | Pigott et al. | Mar. 10, 1936 |
| 2,370,606 | Morgan et al. | Feb. 27, 1945 |
| 2,623,384 | Pigott | Dec. 30, 1952 |
| 2,780,091 | Amen | Feb. 5, 1957 |

OTHER REFERENCES

Automotive Industries, vol. 102, No. 4, pages 34–37 and 82, February 15, 1950.